United States Patent
Barthel

(10) Patent No.: US 10,676,038 B2
(45) Date of Patent: Jun. 9, 2020

(54) CAMERA ARRANGEMENT FOR A VEHICLE HAVING TWO HOUSING PARTS AND AN INSTALLATION METHOD OF SAID CAMERA ARRANGEMENT

(75) Inventor: Joachim Barthel, Essen (DE)

(73) Assignee: HUF HÜLSBECK & FÜRST GMBH & CO. KG, Velbert (DE)

( * ) Notice: Subject to any disclaimer, the term of this patent is extended or adjusted under 35 U.S.C. 154(b) by 510 days.

(21) Appl. No.: 13/984,879

(22) PCT Filed: Feb. 10, 2012

(86) PCT No.: PCT/EP2012/052279
§ 371 (c)(1),
(2), (4) Date: Nov. 26, 2013

(87) PCT Pub. No.: WO2012/107547
PCT Pub. Date: Aug. 16, 2012

(65) Prior Publication Data
US 2014/0085467 A1    Mar. 27, 2014

(30) Foreign Application Priority Data

Feb. 11, 2011    (DE) .................... 10 2011 000 684

(51) Int. Cl.
*B60R 11/04* (2006.01)
*B60R 11/00* (2006.01)

(52) U.S. Cl.
CPC ....... *B60R 11/04* (2013.01); *B60R 2011/0094* (2013.01)

(58) Field of Classification Search
CPC ... B60R 11/04; B60R 2011/0094; B60R 1/00; B60R 2300/105; B60R 2300/802; H04N 7/18; H04N 7/181
See application file for complete search history.

(56) References Cited

U.S. PATENT DOCUMENTS

D388,107 S * 12/1997 Huckins ................. D16/208
2004/0232787 A1* 11/2004 Kopf ................. H02K 11/0073
310/89

(Continued)

FOREIGN PATENT DOCUMENTS

CN    1764272 A    4/2006
CN    200988459 Y    12/2007

(Continued)

OTHER PUBLICATIONS

English machine translation of Schuetz (DE102009008281).*

(Continued)

*Primary Examiner* — Mohammed Jebari
(74) *Attorney, Agent, or Firm* — Cantor Colburn LLP

(57) ABSTRACT

A device for a tailgate (80) of a vehicle includes a camera unit for capturing images of the outer region of the vehicle and a control unit for controlling a part of the vehicle. The camera unit and control unit are arranged adjacent each other on the vehicle by means of a carrier element. The camera unit is accommodated in a housing in a protected manner, and a movable closure element is provided to close a housing opening. The closure element can be moved by means of a drive unit into at least two end positions, a closed position and an open position. The housing is constructed in at least two parts, the carrier element forming a first housing part on which the control element and the camera unit can be arranged, and the drive unit arranged on a second housing part.

10 Claims, 9 Drawing Sheets

(56) References Cited

U.S. PATENT DOCUMENTS

| | | | | | |
|---|---|---|---|---|---|
| 2006/0256459 | A1* | 11/2006 | Izabel | ................... | B60R 11/04 359/872 |
| 2009/0231430 | A1* | 9/2009 | Buschmann | ......... | B60Q 1/0023 348/148 |
| 2009/0309971 | A1* | 12/2009 | Schuetz | .................. | B60R 11/04 348/148 |
| 2010/0040361 | A1* | 2/2010 | Schuetz | .................. | B60R 11/04 396/428 |
| 2010/0209096 | A1* | 8/2010 | Buschmann | ............ | B60R 11/04 396/448 |
| 2013/0182112 | A1* | 7/2013 | Liepold | .................. | B60R 11/04 348/148 |
| 2013/0235204 | A1* | 9/2013 | Buschmann | ............ | B60R 11/04 348/148 |
| 2013/0335624 | A1* | 12/2013 | Barthel | ................ | H04N 5/2251 348/373 |

FOREIGN PATENT DOCUMENTS

| | | |
|---|---|---|
| CN | 101799614 A | 8/2010 |
| CN | 101842264 A | 9/2010 |
| DE | 10351363 A1 | 6/2005 |
| DE | 102009008281 A1 | 8/2010 |
| DE | 102009008283 A1 | 8/2010 |
| DE | 102010008214 A1 | 9/2010 |
| EP | 0076578 A1 | 4/1983 |
| JP | 2005119561 A | 5/2005 |

OTHER PUBLICATIONS

English Machine Translation of Zhu (CN201013187).*
Chinese Office Action dated Mar. 23, 2015 re: Application No. 201280013042.8.
International Search Report dated Apr. 4, 2012 re: PCT/EP2012/052279.
International Preliminary Report on Patentability dated Aug. 13, 2013 re: PCT/EP2012/052279; pp. 6.

* cited by examiner

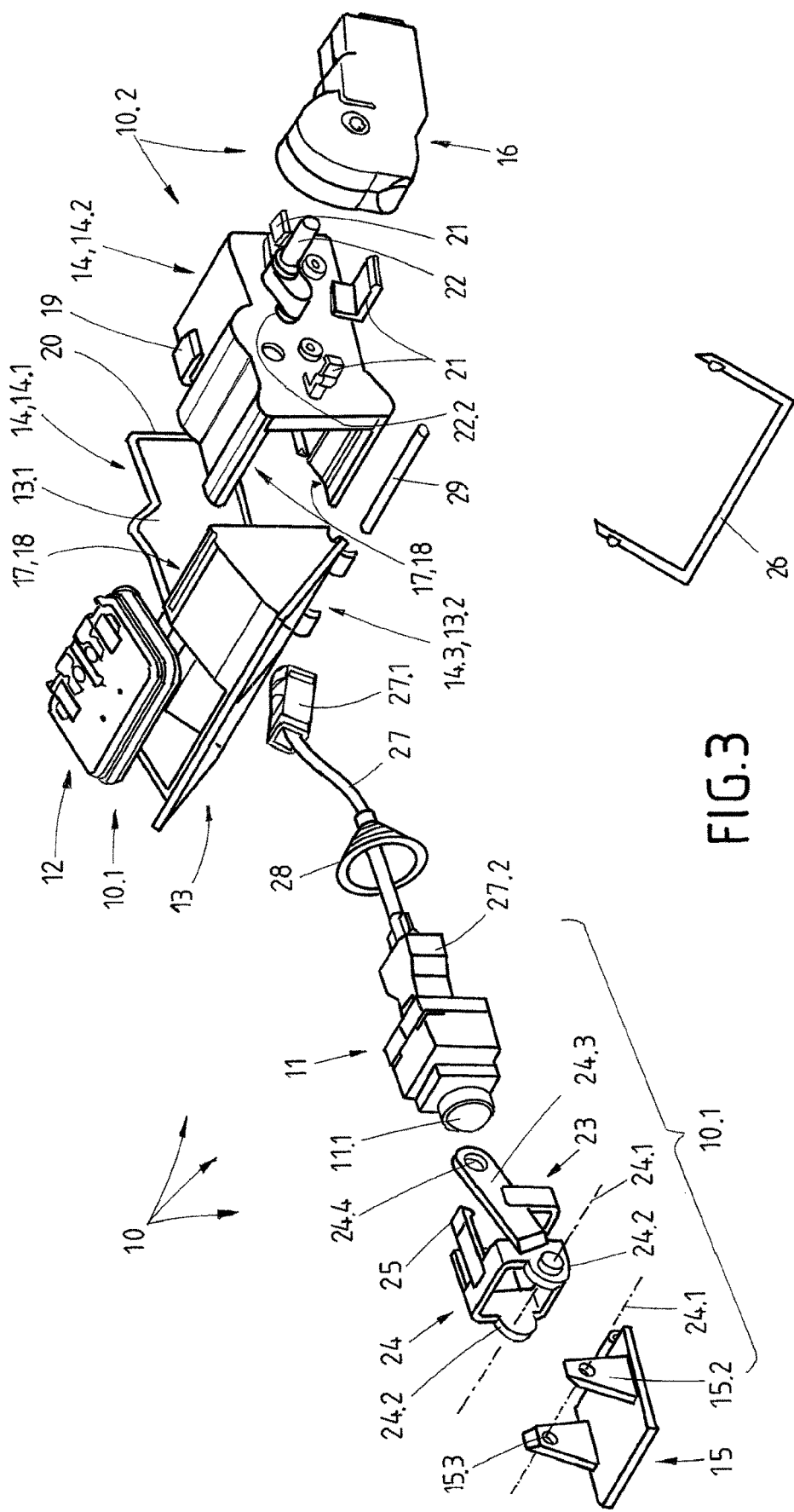

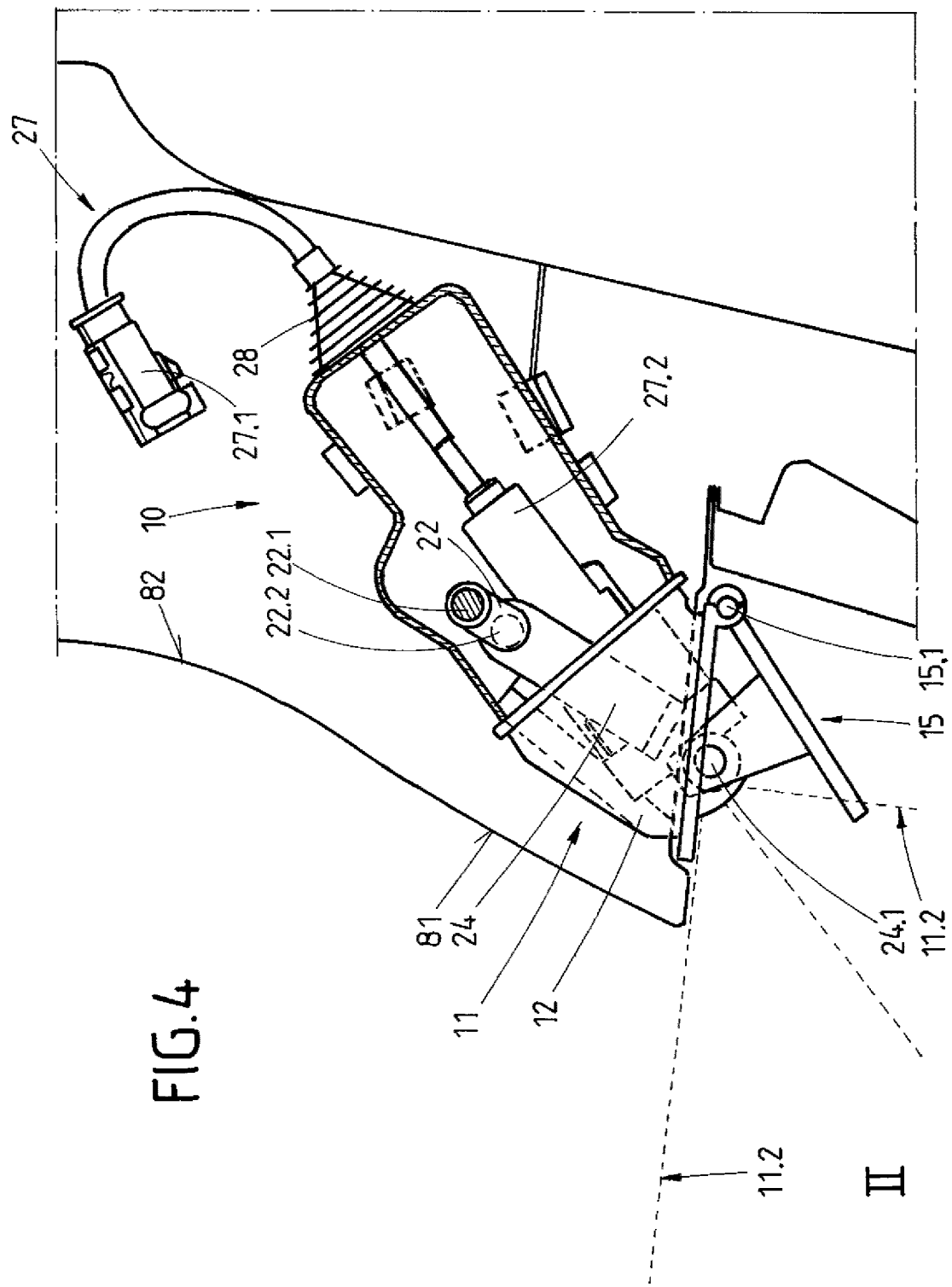

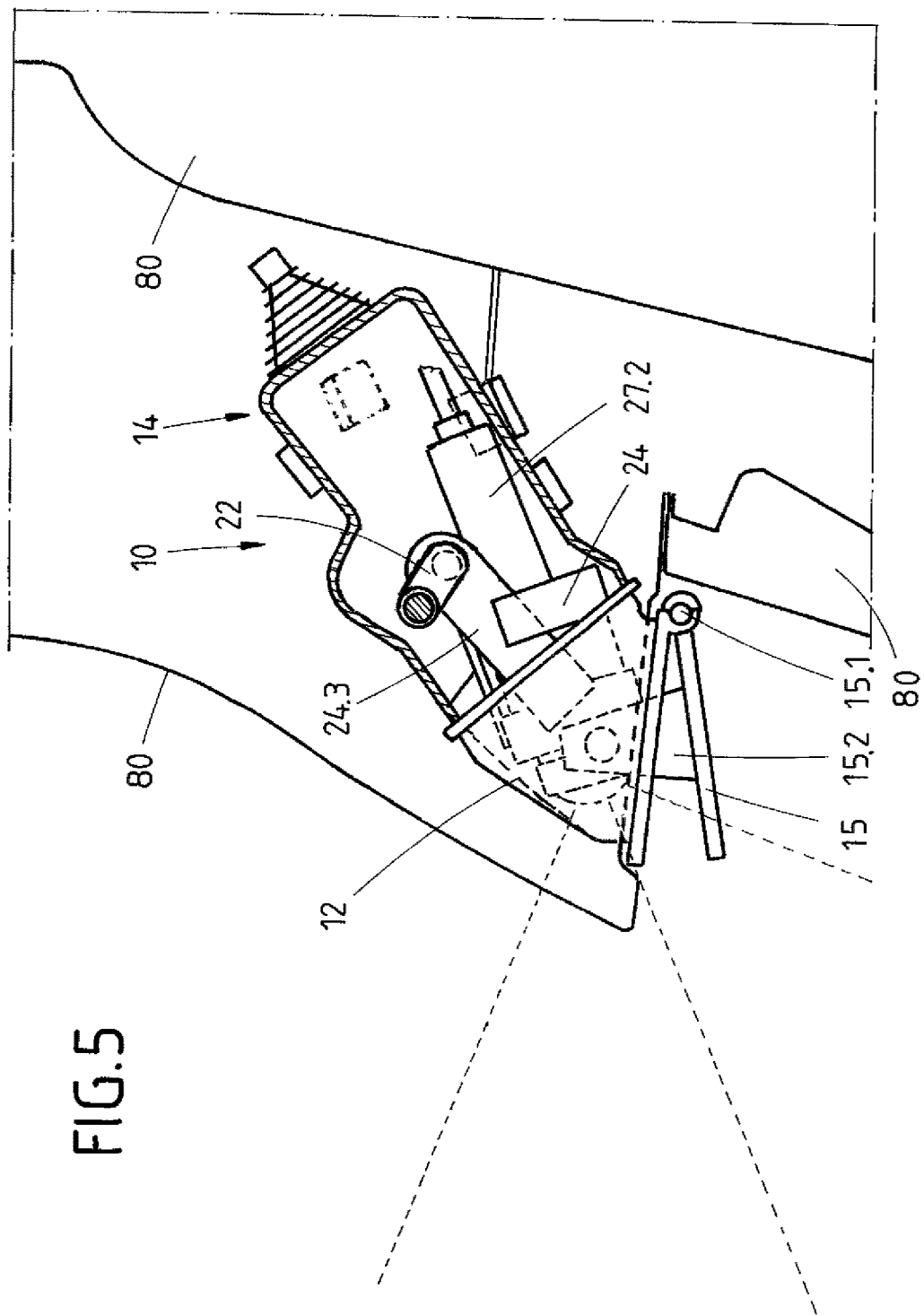

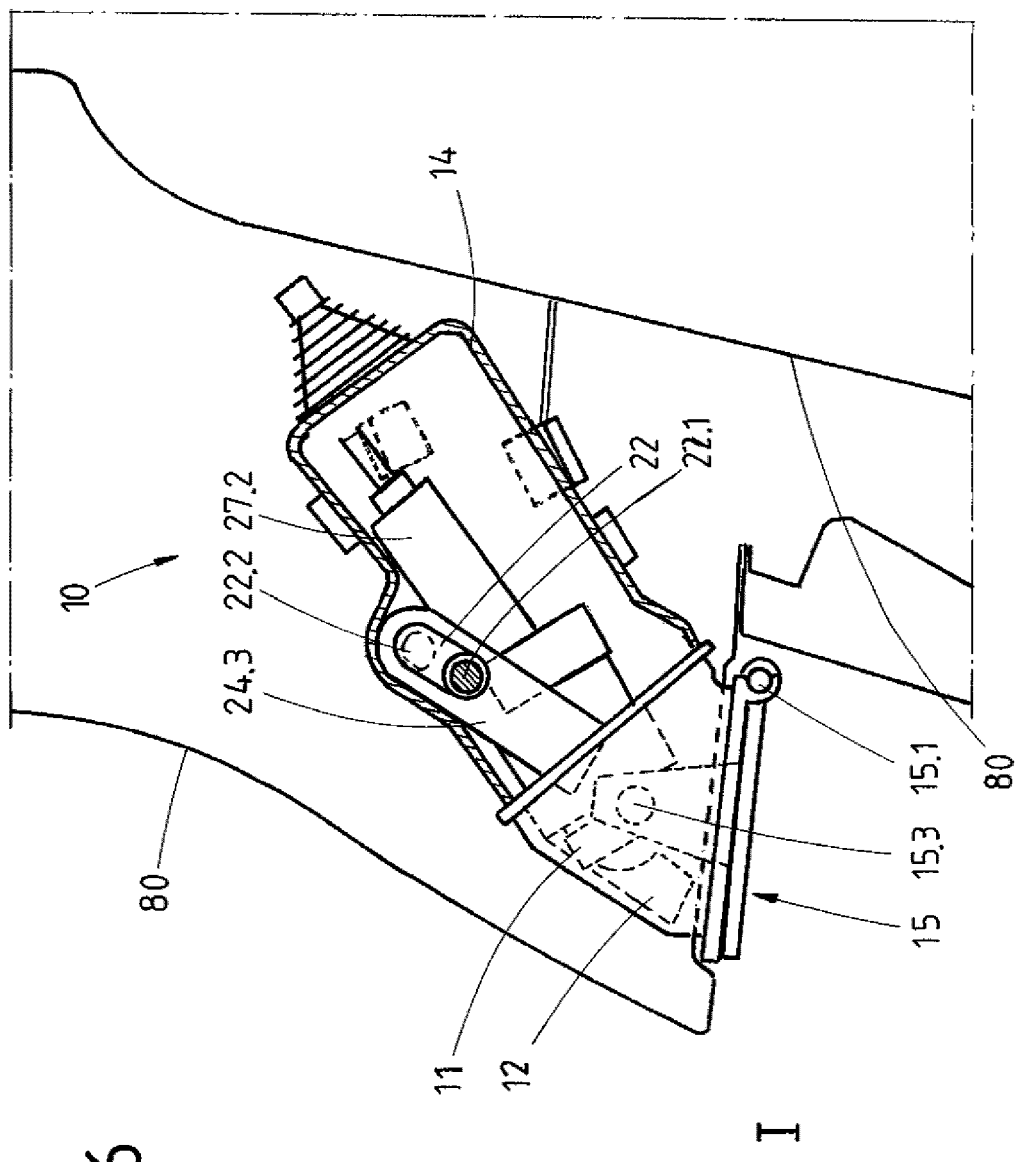

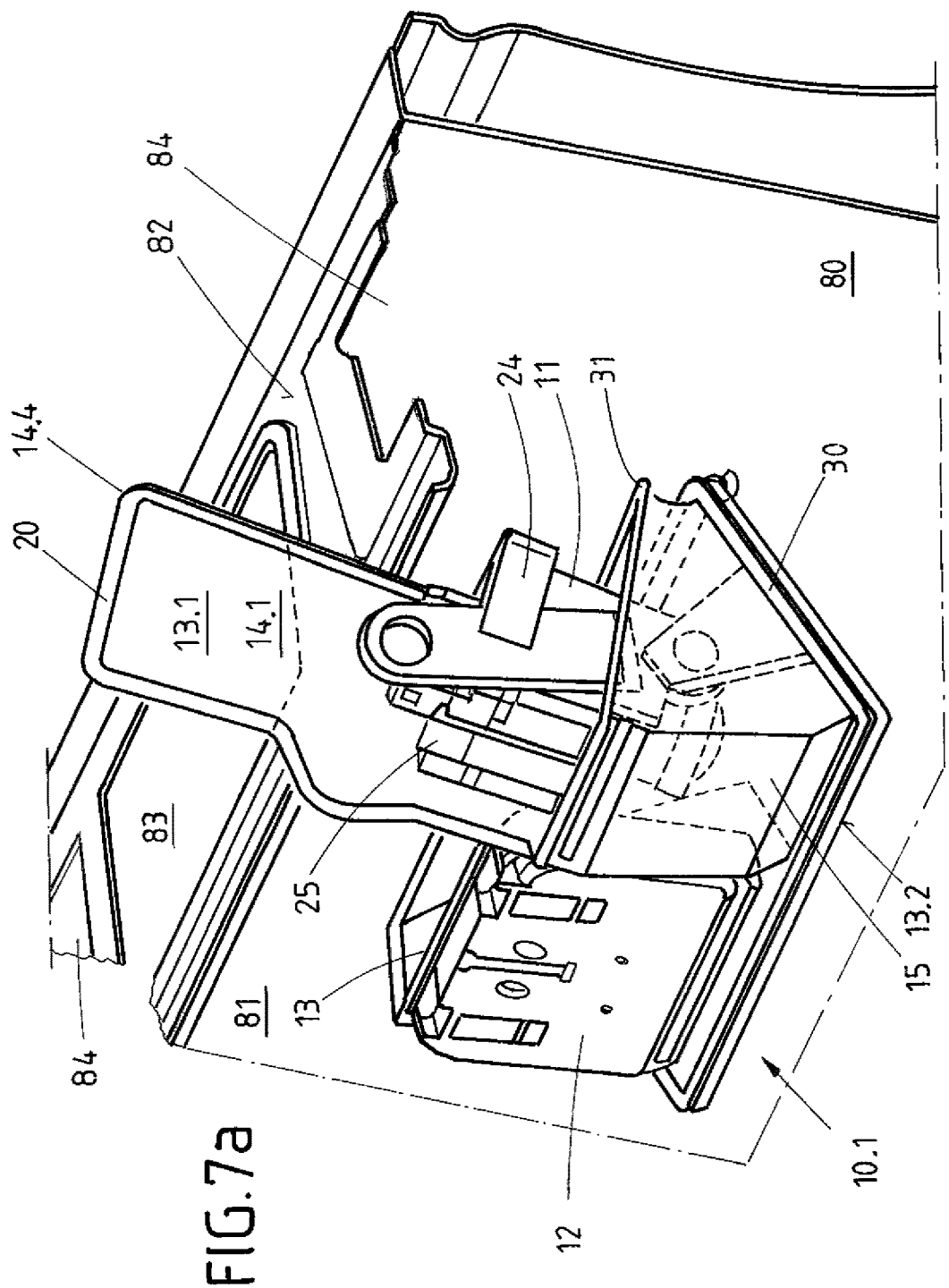

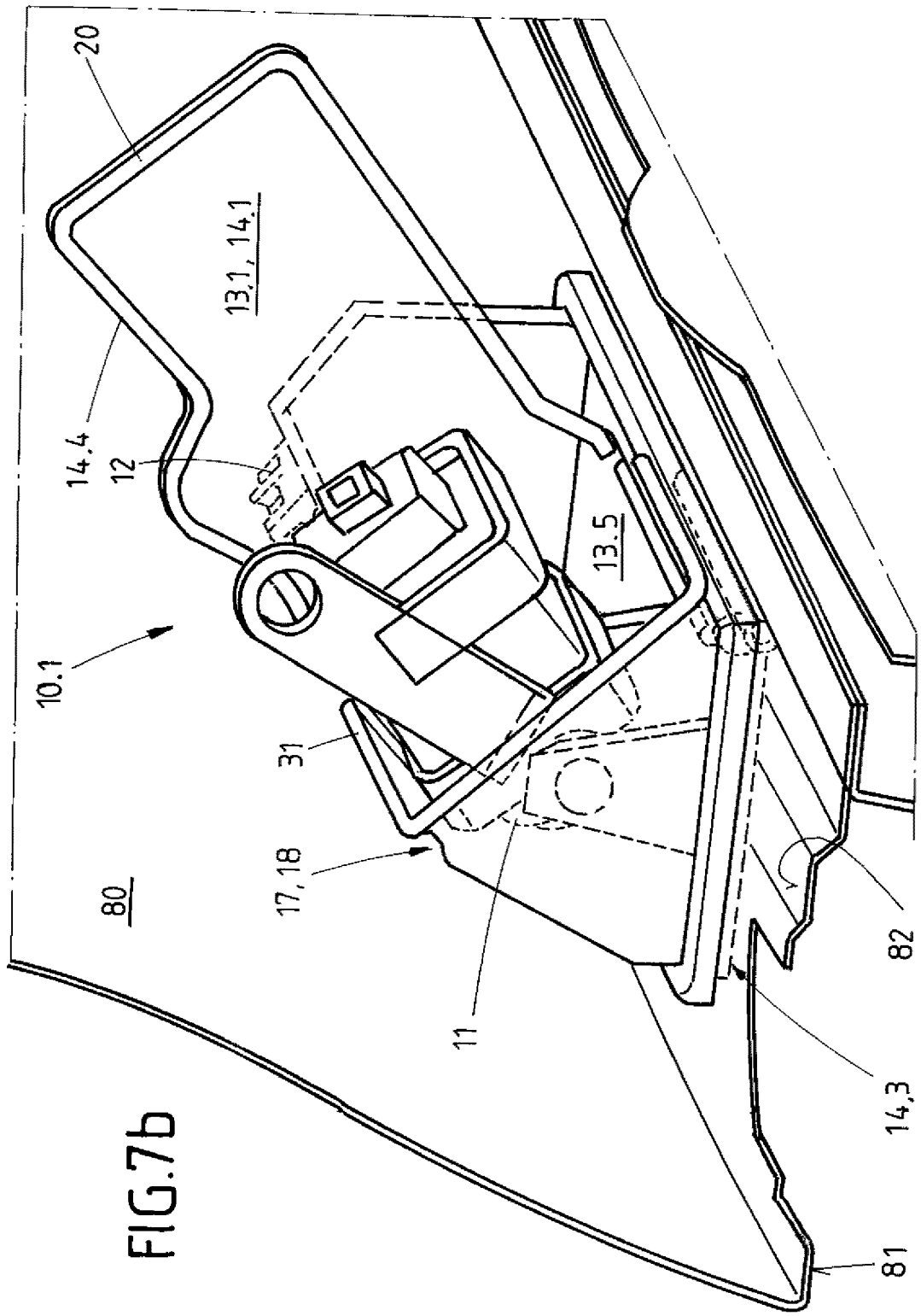

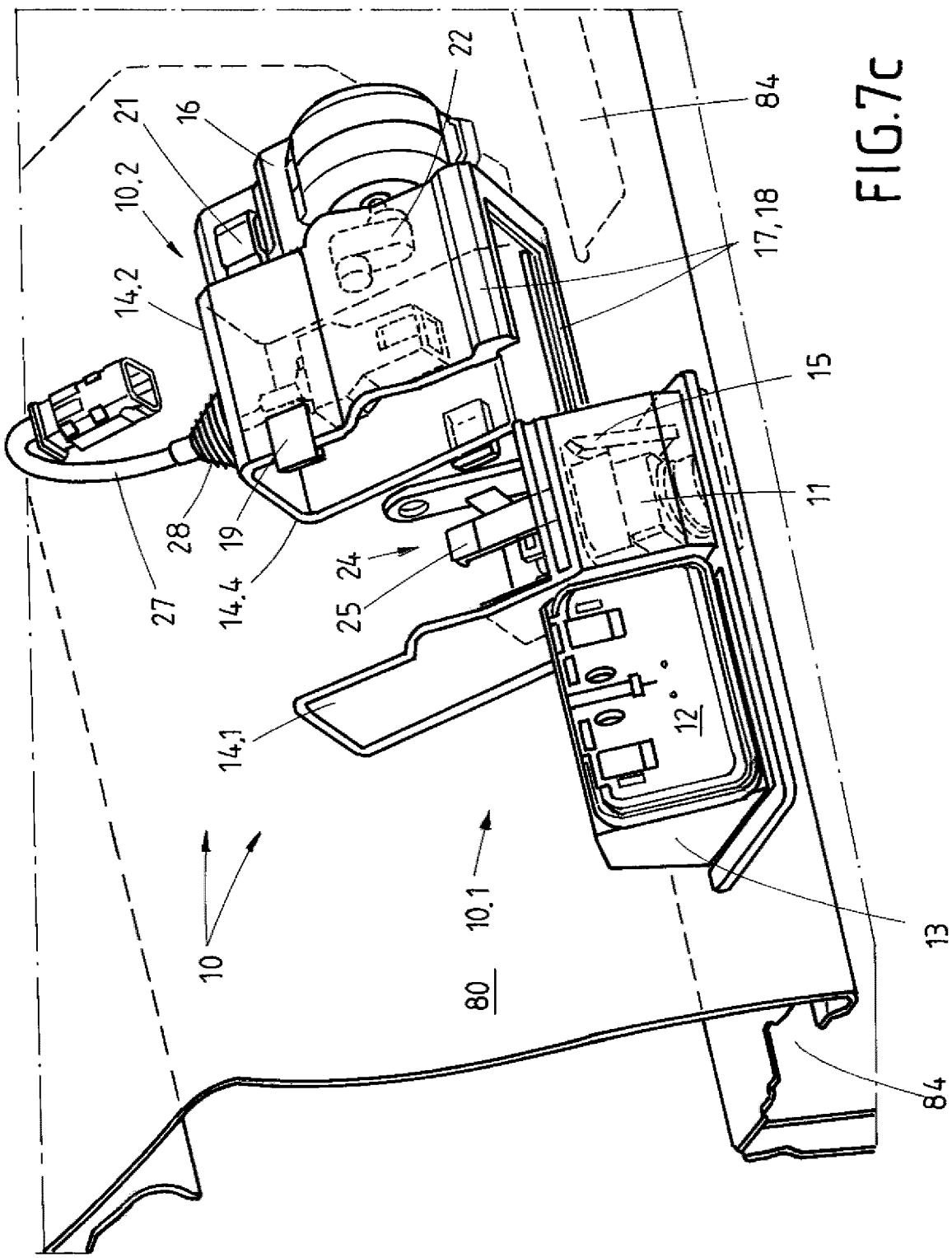

CAMERA ARRANGEMENT FOR A VEHICLE HAVING TWO HOUSING PARTS AND AN INSTALLATION METHOD OF SAID CAMERA ARRANGEMENT

TECHNICAL FIELD

The invention relates to a device, in particular for the tailgate of a vehicle, with a camera unit that is used to acquire images of an outer area of the vehicle, and with a control unit, which is used to control a vehicle part, such as an electrical lock for the tailgate. In particular, the camera unit and the control unit are arranged close to one another by means of a support element on the vehicle. The camera unit at least is installed in a housing and protected against external environmental influences, while a movable closure element is provided to close an opening in the housing, whereby the said closure element can be moved by the drive unit into at least two end positions, namely a closed position and an open position.

Furthermore, the present invention also indicates a method for operating a device, in particular for the tailgate of a vehicle, with a camera unit and a control unit.

BACKGROUND

Numerous devices are known from the prior art, which describe a camera unit, in particular arranged on the tailgate of a vehicle, enabling the acquisition of images of the area behind the vehicle. The resulting image can then be displayed to the driver in the vehicle in order to facilitate reversing operations. To prevent dirtying of the camera unit, it is arranged behind a closure element that can be moved from a closed partition to an open position to enable the acquisition of images by the camera unit. Such a device is known, for example, from publication DE 103 51 363 A1. Moreover, various control units are arranged on modern vehicles, for example, to open the tailgate of a vehicle. From the prior art it is also known that the arrangement of such a control unit with the camera unit in a common apparatus is in the vehicle in order to use as few separate components as possible. The installation of the common apparatus is also facilitated in this way. The disadvantage, however, is that such an apparatus requires a correspondingly larger amount of space.

BRIEF SUMMARY

The present invention provides such an apparatus with a camera unit and a control unit having a compact design, taking up limited space and, if necessary, that is easy to install. The present invention further provides an appropriate method for installing such an apparatus that enables simple installation even in a tight space.

The inventive apparatus is characterized in that the housing for the camera unit is in the form of at least a two-part construction. The support element forms a first housing part on which the control unit and the camera unit, specifically in a pre-assembled state, can be arranged. A second housing part is the drive unit that is arranged specifically on an outer wall of the housing. The two-part construction of the housing enables the support element with the first housing part to be mounted on the vehicle by initially inserting it from the outside through an opening, especially in a body part, i.e. an outer side. This opening can be designed to be particularly small, because the entire apparatus with all its parts and elements does not have to pass through this opening. The second half of the housing can then be mounted on the vehicle from the inside or from an inner side of the bodywork part enabling the two housing parts to be assembled together. Thus, it is possible to avoid an elongated and narrow design of the inventive device, since the apparatus can also be supplemented on the side by the second housing part, which means that a small opening is sufficient, specifically in a body part of the vehicle. In addition to this, the apparatus according to the invention can also be used in very awkward installation spaces that do not have a large installation depth.

The invention is explained through various arrangements, the dependent claims, and the following description. The features and details that are disclosed in connection with the apparatus of the invention also apply to the method of the invention, and vice versa, so that the disclosure of the individual aspects of the invention are mutually applicable.

In the device according to the invention, it may be arranged that the housing opening for the camera unit used to acquire images of the exterior of a vehicle is arranged at least in the first housing part. The movable closure element as well as the camera unit, may also be arranged in the first housing part. In this case, the movable closure element has a fixed axis of rotation that is specially designed on a supporting shaft. Thus, it is possible from a manufacturing point of view to assemble the control unit and the camera unit with the support element, which further facilitates assembly in the vehicle. In addition, this can significantly reduce the number of parts of the apparatus. To this end, the drive unit can be arranged in the second housing part, specifically on the outside, i.e. the exterior surface of the housing, to drive the movable closure element via at least one connection element.

To this end, an opening in the second housing part may be provided for the connection element. Thus the manufactured apparatus is substantially comprises only two parts, i.e. the support element with the first housing part, and the second housing part. By assembling the two housing parts, the apparatus according to the invention can be assembled so that it is functionally effective.

To facilitate the assembly of the housing parts, a linear guide may be provided between the first housing part or the support element and the second housing part. In this way, the second housing part can be laterally moved, i.e. substantially perpendicularly to the direction of movement of the camera unit in order to be slid towards the first housing part.

Furthermore, it is conceivable within the scope of the invention that a labyrinth seal may be provided between the first housing part and the second housing part in order to seal the assembled parts. Here, in particular, the labyrinth seal may be formed by the linear guide. Thus from a technical perspective, a particularly elegant sealing of the housing may be produced. At least one snap-lock connection may be provided in order to securely connect the housing parts together. This results in a secure connection being simultaneously obtained simply by assembling the two housing parts together. Of course, the two housing parts may be screwed, riveted, bonded or welded together. However, no additional tools are required by using a snap-lock connection between the two housing parts. In addition, the snap-lock connection is reversibly detachable but still keeps the two housing parts securely together.

According to the invention, in the apparatus it may be that the support element forms at least the first flat wall of the housing on which a sealing element is arranged in order to interact with the housing edge of second housing part. In this way, this first housing wall constitutes a lateral wall of the housing that protrudes backwards in the direction of movement of the camera on the support element. Likewise, the support element may form two housing walls of the housing, whereby the first housing wall is designed to be flat and is arranged to be substantially perpendicular to the second housing wall while the second housing wall has a housing opening that is closable by the closure element. The closure element may be provided to protect the camera unit and/or the control unit, whereby the respective units are then protectively placed in the housing of the apparatus. If the control unit is arranged in the housing of the apparatus, dirtying of the operating part can be largely avoided, as the latter will also be protected by the closure element. The aforementioned drive unit may also be arranged inside the housing of the apparatus in order to be protected against external environmental influences. Optionally, it is conceivable that the control unit and/or the drive unit may be arranged outside the housing, specifically via a snap-lock connection. Thus, only the most sensitive units, such as the camera unit, would be housed within the protected housing. This would also mean that the space required for the apparatus according to the invention would be reduced to a minimum. Thus it is also possible to use standard components for the control unit and the drive unit, which may reduce the cost of production.

In the device according to the invention, the camera unit may be arranged to be movable in the housing, whereby in the closed position I, the camera unit is positioned behind the closure element in the housing, while in the open position II it is uncovered by the closure element for image acquisition. In this way, the camera unit may be driven by the drive unit to move at least in the housing and, if necessary, outside the housing. The aforementioned drive unit may be identical to the drive unit for the closure element. In particular, the camera unit may be connected to a drive mechanism for the closure element, so that the camera unit and the closure element may be driven simultaneously by the drive unit. Thus the number of components of the apparatus may be significantly reduced.

Further, it is conceivable that the camera unit is supported to be movable on a slide in the housing, whereby the slide serves both as the actuator arm for the closure element while also being driven by the connection element. The slide serving as the actuator arm is therefore a part of the drive mechanism for the closure element. It is also conceivable that the slide and the camera unit are integral, whereby the camera unit is secured positively to the slide, in particular by means of a snap-lock.

The snap-lock may in this case be designed in particular as a clip connection, so that simple mounting of the camera unit on the slide is possible, as for example, where a clip on the slide can grip behind an edge of the camera unit. In addition, the camera unit may be actually arranged on the slide in order to obtain particularly secure support, whereby disturbing influences such as vibrations during image acquisition by the camera unit may be largely avoided. The slide itself may be connected on one side with the closure element and on the other side to the connection element, which in turn, is connected to the drive unit. Accordingly, the closure element may be driven indirectly by the drive unit via the drive mechanism, whereby the slide for the camera unit represents a transfer element. To this end, the slide may be arranged to be rotatable on the closure element, whereby in particular only one axis of rotation is used, while the camera unit is arranged between two fixed rotary points of the axis of rotation to permit image acquisition. Bearings on both sides of the slide at the pivot points of the closure element can also contribute to the stability of the entire drive mechanism for the camera unit. The closure element itself may be rotatably mounted on the support element via a support shaft, in particular in the area of the housing opening. In this way, the closure element only rotates around the above-mentioned support shaft. The camera slide with the camera unit on the apparatus of the invention is simultaneously moved by this rotational movement in order to move the camera unit to its image acquisition position.

In the context of the present invention, it may also be provided that the camera unit and/or the closure element may be fixed in an interlocking and/or form-fitting manner in at least two end positions I, II. The additional interlocking and/or form-fitting fixing of the camera unit and/or the sealing element ensures on the one hand that a simple raising of the closure element is not possible in the closed position I, while, on the other hand, the camera unit is also secured against mechanical vibrations in the open position II of the sealing element.

In the method according to the invention, an apparatus, in particular for the tailgate of a vehicle, has a camera unit that is used for the image acquisition of the exterior of the vehicle, and a control unit for the operation of a vehicle part such as an electric lock for a tailgate, whereby the camera unit and the control unit in particular are arranged beside one another by means of a support element on the vehicle, and at least the camera unit is housed in a protected housing, while a movable closure element is provided to close an opening in the housing whereby the said closure element is movable by a drive unit to at least two end positions I, II, i.e. a closed position I and an open position II. In the case of this apparatus, it may also be the apparatus according to the invention described above.

Furthermore, it is provided in the method according to the invention that in a first assembly step, a part of the apparatus is mounted through an opening in a body part of the vehicle from outside, i.e. from an outer side, and that in a further assembly step, the remainder of the apparatus is mounted from the inside, i.e. from the other side, whereby the housing for the camera unit is formed by assembling the parts. Thus, it is also possible to assemble the apparatus through a very small opening on the vehicle because the apparatus is in two parts. Consequently, the fully assembled device may be adjusted to fit the available space. The use of the apparatus is possible even in a very limited space. In particular, the two-sided mounting of the apparatus from the outside and the inside enables optimum adaptation to the space available for the device. Of course, this assembling of the two parts together must be as simple as possible, otherwise the required assembly time, and therefore the costs, would increase unnecessarily.

In the method according to the invention, it can be arranged that at least the housing is constructed in at least two parts, whereby the support element forms a first housing part in which the control unit and the camera unit are located, while the support element is mounted from the outside through the opening on the vehicle in the first assembly step. In a further step, the housing halves are assembled, and the drive unit is arranged on the second housing part. Thus, a cover in the form of the second housing part is not simply pushed onto the first housing part, but the second housing part itself has main components of the apparatus in addition to the housing. It is also conceivable here that the camera unit is not arranged on the first housing part, but in the second housing part, and is arranged in the housing parts in the closed housing assembly. Even the control unit may only need to be connected to the support element in an additional assembly step, after the first assembly step. When assembling the housing parts, an electrical cable for the camera unit may also be connected simultaneously; this cable may be connected to the remainder of the vehicle electronics via an opening in the housing. To give the electrical cable adequate room for movement in the housing, it may be sealed with a bellows seal in the housing, which matches a larger opening in the housing.

Furthermore, it may be provided in the method according to the invention that the apparatus is held by at least one fixing element, specifically a fixing bracket on the vehicle. In this way the fixing element is at least form-fitting and the fixing element for fixing the apparatus is merely pushed on. A tool-free assembly of the entire apparatus on the vehicle is thereby possible. Further assembly steps may be performed after the first assembly step, i.e. the partial insertion of the apparatus from the outside through the opening on the vehicle, whereby the said further sequence of steps may be varied. Thus, in the next assembly step, the device and the housing may be assembled first, and then the attachment of the apparatus to the vehicle effected. It is also conceivable that the attachment of the first part of the apparatus is applied first to the vehicle, and only then is the assembly of the parts of the apparatus affected. It is also conceivable that the apparatus is attached to the vehicle in the first assembly step, and a corresponding snap-lock brought into play. In this case, an additional fixing of the device using a further fixing element, in particular in the form of a fixing bracket, is avoided.

BRIEF DESCRIPTION OF THE DRAWINGS

Further advantages, features and details of the invention will become apparent from the following description in which the invention is illustrated with reference to the drawings. The features mentioned in the claims and in the description of the apparatus and the method according to the invention may be essential to the invention either individually or in any combination. The figures show:

FIG. 3: an exploded view of the apparatus with all the essential components, FIG. 4: a cross-section of an assembled device according to the invention with the closure element in the open position, FIG. 5: a cross-section through the apparatus of FIG. 4, but with the closure element in an intermediate position, FIG. 6: a cross-section through the apparatus of FIGS. 4 and 5, but with the closure element in the closed position I, FIG. 7a: a three-dimensional view of the apparatus during the first assembly step, FIG. 7b: a three-dimensional view of the apparatus of FIG. 7a in a further assembly step, FIG. 7c: a three-dimensional view of the apparatus in a further assembly step, in which the housing parts are assembled together.

DETAILED DESCRIPTION

Figure 1:
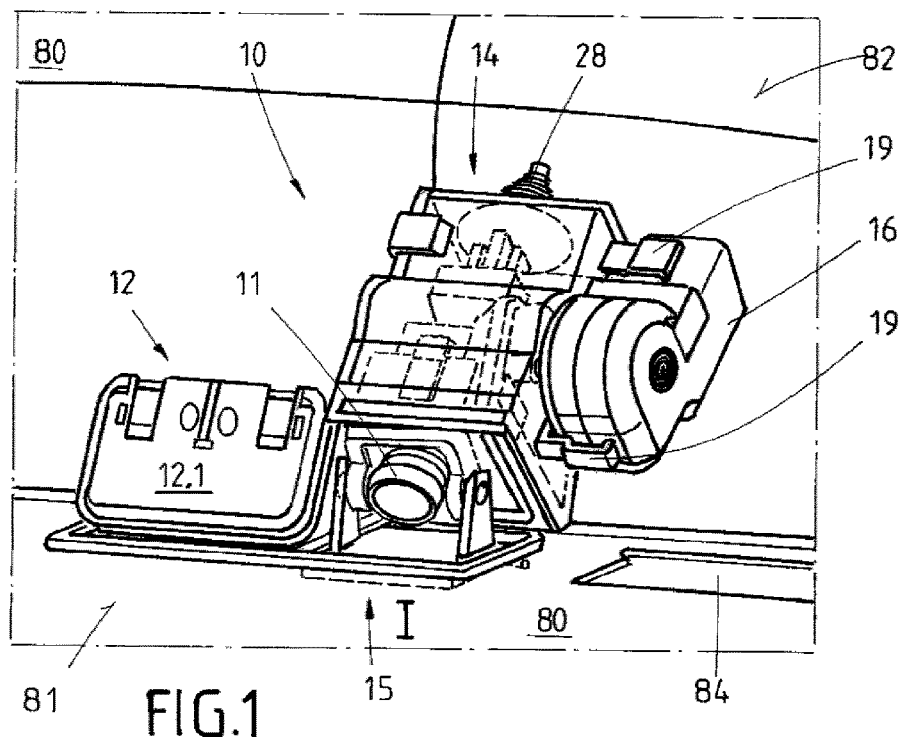
FIG. 1: a three-dimensional view of the device according to the invention in the closed position I of the closure element.
Figure 2:
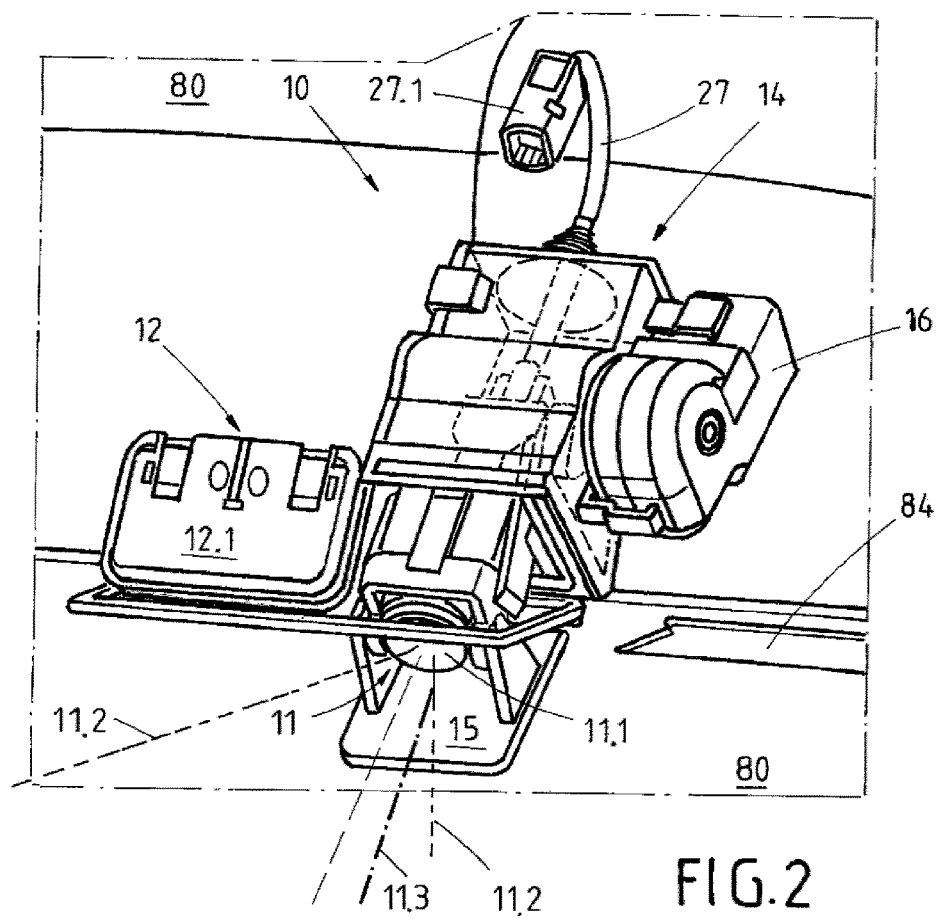
FIG. 2: a three-dimensional view of the apparatus of FIG. 1, however with the closure element in the open position.

In FIGS. 1 and 2, the inventive apparatus 10 is shown in its mounted position on a body part 80 of a vehicle, whereby body part 80 is in the form of a tailgate. To the left and right of apparatus 10 (as viewed in FIGS. 1 and 2), the openings 84 for the number plate lights of the vehicle, which are arranged adjacent to the opening 83 for the apparatus 10 (see also FIG. 7a) can be seen. In FIG. 1, the apparatus 10 is shown with all its components. In this case, a control unit 12 is arranged to the left of a camera unit 11 on a support element 13 of the apparatus 10, according to the invention. The camera unit 11 is protected against environmental influences by being located inside a housing 14, whereby an electrical cable 27 is led out of the housing 14 for the camera unit 11 by means of a waterproof bellows seal 28. The electrical cable 27 has a first connector 27.1, which serves to connect the camera unit 12 on the vehicle side. A second connector 27.2 is provided at the other end of the electrical cable 27 to connect the camera unit 11 to the electrical cable 27. The above-mentioned bellows seal 28 serves to seal the housing 14 securely against external environmental influences even in the event of larger movements of the electrical cable 27.

The apparatus 10 is shown from the same perspective in FIGS. 1 and 2, whereby only the rear side 12.1 of the control unit 12 can be seen. The control unit 12 may be operated manually, e.g. by hand, for which a support opening 13.5 is provided in the support element 13, and through which the operator can reach the control unit 12. The housing 14 is arranged on the support element 13 for the camera unit 11 on the right next to the control unit 12. A housing opening 14.3 is also provided to the right of the support opening 13.5 to enable the camera unit 11 to acquire images. The housing opening 14.3 may be moved by a movable closure element 15 between a closed position I, and an open position II. FIG. 1 shows the closure element 15 in the closed position I so that the complete camera is housed securely in the housing 14. The adjustment of the closure element 15 between the end positions I and II is effected by a drive unit 16 and, indirectly via a connection element 22 and a drive mechanism 23. The drive unit 16 is arranged on an outer wall 19 of the housing 14 via snap-lock connections that are stationary and torque proof. Two circular cams are also arranged on the outer wall of the housing 14 to ensure secure torque-proof fixing of the drive unit 16 on the support element 13 and the apparatus 10 (shown in FIG. 3).

In FIG. 2, the camera unit 11 is shown in its operating position, for which purpose the closure element 15 is arranged in the open position II. Thus, the closure element 15 frees up the housing opening 14.3 to enable the camera unit 11 to acquire images. A viewable area 11.2 of the camera lens 11.1 is shown in FIG. 2 in the form of a viewable cone. In this case, the viewable area 11.2 is so aligned that it views a vehicle edge on the one hand, while on the other hand, it is directed towards the natural horizon. Thus in the acquired image, the vehicle's driver also receives information on the rear view with respect to the specific position of the vehicle. The viewable area 11.2 is shown here in FIG. 4 from a side view.

In FIG. 3, the apparatus 10 of FIGS. 1 and 2 is shown in the non-assembled state in an exploded view. The support element 13 is used for the reception and fixing of the control unit 12 and the camera unit 11, which are arranged in the two-part housing 14. The other components of the apparatus 10 are also connected directly or indirectly with the support element 13. This includes, for example, the drive unit 16, which is connected to the support element 13 via the housing 14. The movable camera unit 11 is connected with the closure element 15 via a slide 24, whereby the slide 24 forms a part of the drive mechanism 23. A snap-lock 25 in the form of a protruding clip element is provided to fix the camera unit 11 on the slide 24. The slide 24 holds the full camera unit 11, so that secure fixing is guaranteed. The lens 11.1 of the camera unit 11 projects outwards between two pivots 24.2 of the slide 24, which serve to connect the slide 24 with the closure element 15 via a fixed axis of rotation 24.1. To this end, the connection element 15 is arranged on two parallel support arms 15.2, which protrude from the inside of the closure element 15, while their ends have an opening 15.3 for the pivots 14.2 of the slide 24. To simplify the assembly of the apparatus 10, the support arms 15.2 are flattened at their outer ends, so that the pivots 24.2 of the slide 24 can push away the support arms 15.2 slightly on assembly, so that subsequently a form-fit but rotatable connection between the slide 24 and the closure element 15 can be achieved. To this end, the support arms 15.2 are designed to be slightly resilient. The closure element 15 also has a fixed axis 13 on the support element 15.1, which is formed by the support shaft 29. A movement of the slide 24 causes the closure element 15 to be rotated to and fro between its end positions I, II. The slide 24 also has an actuator arm 24.3, which interacts mechanically with the connection element 22 in the assembled state of the apparatus, for which purpose an opening 24.4 is provided in the actuator arm 24.3, in which an eccentric cam 22.2 of the connection element 22 engages in a form-fitting manner. On the one hand, the connection element 22 is connected to slide 24, specifically to the actuator arm 24.3, and on the other hand to the drive unit 16, which provides the rotation of the connection element 22. The camera unit 11 may thus move in the slide 24 and closure element 15 through the rotational movement introduced by the drive unit 16. It should be mentioned at this point that the closure element 15 is able to close not only the housing opening 14.3, but also the aforementioned support opening 13.5 for the control unit 12. The control unit 12 may also be provided within the housing 14, like the drive unit 16. In the present case, however, the control unit 12, as well as the drive unit 16, are connected directly or indirectly with the support element 13 outside the housing 14.

The two-part housing 14 is formed by the first housing part 14.1, which projects rearwards from the support element 13 as a first flat housing wall 13.1. A sealing element 20 may also be arranged as shown along the housing wall edge 13.1 to effect a particularly good sealing of the housing 14. The second housing part 24.2 represents a second part 10.2 of the apparatus 10, which is assembled after the first step of the assembly of the first part 10.1 of the apparatus 10 on the body part 80. A linear guide 17 is provided between the two housing parts 14.1 and 14.2, whereby the second housing part 14.2 is pushed laterally (i.e. substantially perpendicular to the direction of movement 11.3 of the camera unit 11) onto the first housing part 14.1. The linear guide 17 also simultaneously forms a labyrinth seal 18 in order to tightly seal the connections edges 14.4 of the housing 14. In addition, the supplemental seal 31 shown in FIGS. 7a and 7b may be used in the area of the linear guide 17.

As can be clearly seen in FIG. 3, the drive unit 16 is held positively from the outside on the second housing part 14.2 by the snap-lock connection 21. The connection element 22 protrudes from the inside of the second housing part into the drive unit 16. Thus, the housing parts 14.1 and 14.2 may be securely connected with one another; the snap-lock connections 19 are provided above, below and/or to the side on the outer housing wall in order to interact with the first housing part 14.1.

A cross-section through the assembled apparatus 10 is shown in the FIG. 4, whereby the closure element 15 is in its open position II and the camera unit 11 may effect the image acquisition. The section shown in FIG. 4 runs parallel to the lateral outer wall in the housing 14 on which the drive unit 16 is mounted, whereby the section extends through the connection element 22. The closure element 15 is mounted on the fixed axis of rotation 15.1 on the support element 13, specifically by means of the support shaft 29. In this operating position of the camera unit 11, the latter is mounted more or less centrally in the housing 14 so that the distance between the second connector 27.2 and the housing walls is designed to be approximately equal. The axis of rotation 22.1 of the connection element 22 is defined by the drive unit 16, whereby the eccentric cam 22.2 interacts with the connection element 22 and slide 24 for movement of the camera unit 11 and the closure element 15. To this end, the connection element 22 is rotated counter-clockwise about its fixed axis of rotation 22.1 in order to move the closure element from its open position II into its closed partition 1. FIG. 5 shows an intermediate position of the camera unit 11 and the closure element 15. In this way, the connection element 22 is rotated counterclockwise by approximately 90° around the axis of rotation 22.1, whereby the slide 24 is drawn further into the housing interior. In this intermediate position, the second connector 27.2 almost touches the housing inner wall of the housing 14. As the slide 24 is connected to the two pivot points 24.2 of the support arms 15.2 of the closure element 15, the closure element 15 is also rotated on the support element 13.

FIG. 6 now shows the camera unit 11 in its position of rest while the closure element 15 is shown in its closed position I. The camera unit 11 has been drawn as far as possible into the housing 14 while the closure element 15 securely closes the housing opening 14.3. In this position, the second connector 27.2 now touches the opposite housing inner wall (compared to the intermediate position of FIG. 5). In addition, the actuator arm 24.3 of the slide 24 almost touches the same housing inner wall. The connection element 22 is rotated about 180° by the drive unit 16 about the axis of rotation 22.1 in order to move the closure element 15 from its closed position I to its open position II and vice versa. The camera unit 11 can only be moved from the closed position I illustrated in FIG. 6 by a clockwise rotation of the connection element 22. It should be mentioned at this point that the closure element 15, the slide 24 and/or the camera unit 11 are also secured in an interlocking and/or form-fitting manner in the end positions I, II.

FIGS. 7a to 7c show the various assembling steps involved in the installation of the inventive apparatus 10 in the vehicle.

FIG. 7a shows how a first part 10.1 of the apparatus 10 is guided from the outside through the opening 83 in the body part 80, and where the openings 84 for the number plate lights can also be seen next to the opening 83 on the left and right. Here, the second part 10.2 of the apparatus 10 is missing as this does not have to pass through the opening 83. The second part 10.2 is formed in the present example by the second housing part 14.2 on which the drive unit 16 and the connection element 22 are also installed. As can be easily seen, the control unit 12 as well as the camera unit 11 in the slide 24 and the closure element 15 are already arranged on the first part 10.1 of the apparatus 10. To achieve a flush mounting, a recess is provided around the rectangular aperture 83 in the body part 80 to fix the apparatus 10, which interacts with the edge of the support element 13, whereby the seal 30 is also provided on the inner side of the support element 13 to interact with the recessed edge of the opening 83.

In a further assembly step, the apparatus 10 is either completed or first fixed to the body part 80. To this end, a fixing element 26 is used as shown in FIG. 3. This fixing element 26 can be designed like a bracket that is guided along between a projection on the support element 13 and the inside 82 of the body part 80, so that the apparatus 10 is positively held by the bracket-like fixing element 26. Of course, other fixing elements 26 are conceivable, such as hook-shaped, specifically cone-shaped latching elements which interact with matching openings in the body part 80 or screws or the like.

In FIG. 7b, the first part 10.1 of the apparatus 10 is arranged on the body part 80. In this case, the second part 10.2 of the apparatus 10 is missing from the apparatus 10. This is formed inter alia by the second housing part 14.2. Thus, the drive unit 16 may be easily connected to the driving mechanism 23 or the slide 24; this is arranged in an assembly position for which assembly aids can be provided. Likewise, the drive unit 16 and the connection element 22 are arranged in a corresponding assembly position on the second housing part 14.2, for which assembly aids may also be provided. In the position of the inventive apparatus 10 in FIG. 7b, only the second housing part 14.2 needs to be slid over the linear guide 17 on the first housing part 14.1, whereby there is an automatic connection between the slide 24 and the connection element 22, as the two parts 22, 24 are in the assembly position. In this case, the eccentric cam 22.2 of the connection element 22 engages positively in the opening 24.2 of the actuator arm 24.3 of the slide 24.

FIG. 7c shows the assembly of the parts 10.1 and 10.2 of the apparatus 10 and the two housing parts 14.1 and 14.2. The connection of the housing 14 can only be effected via the lateral sliding of the second housing part 14.2 towards the first housing part 14.1 and the support element 13. Then, if necessary, the assembly aids for the slide 24 and the connection element 22 are removed and the installation of the apparatus 10 on the body part 80 is completed. As the two housing parts 14.1 and 14.2 are connected with one another in a form-fitting manner via the latching connections 19, no further support or connection of the housing 14 is needed. Thereafter, the apparatus 10 only has to be electrically connected to the other vehicle electronics, for which various electrical connectors may be provided for the respective components 11, 12, 16.

Figure 8:
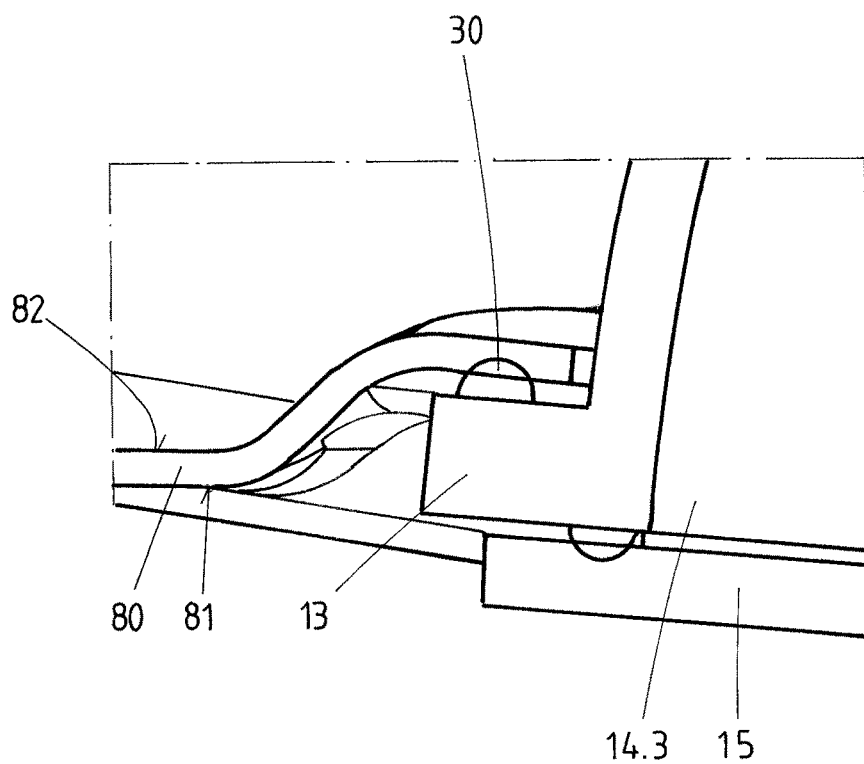
FIG. 8: a sectional view through the connection area between the vehicle or body part and the apparatus, as well as the closure element.

FIG. 8 shows a sectional view of a possible sealing of the inventive apparatus 10 on the body part 80. To this end, various sealing elements can be provided on the edge of the aperture 83 and/or on the circumferential edge of the support element 13. FIG. 8 shows how the oppositely disposed sealing between the body part 80 and the support element 13 also forms a labyrinth seal. Likewise, a seal between the support element 13 and the closure element 15 is arranged to seal the housing 14 optimally.

The invention claimed is:

1. Apparatus, in particular for a tailgate of a vehicle, with a camera unit, which serves to acquire images of the outside area of the vehicle, and a control unit serving to control an electric lock for the tailgate, whereby a support element is provided which has a longitudinal axis of extension, whereby the camera unit and the control unit are arranged in particular next to one another along the longitudinal axis of extension of the support element on the vehicle, and at least the camera unit is protectively housed in a housing, and a movable closure element is provided to close an opening in the housing for the camera unit, and which is movable by a rotary drive unit between at least two end positions, a closed position and an open position, wherein the housing is constructed of at least two parts, whereby the support element forms a first housing part, on which the control unit and the camera unit are arranged, wherein the support element forms at least a first flat housing wall of the housing, on which a sealing element is arranged, and which interacts with a housing edge of a second housing part, wherein the support element forms two housing walls of the housing, whereby the first housing wall is configured to be flat and is arranged essentially perpendicular to a second housing wall, whereby the second housing wall has the housing opening for the camera unit, and the drive unit is arranged on a second housing part, wherein a linear guide is provided between the second housing wall of the support element and the second housing part in order to assemble the two housing parts into a housing, whereby the second housing part can be pushed laterally onto the first housing part, wherein a labyrinth seal is provided between the second housing wall of the second housing part and the labyrinth seal is formed by the linear guide, and wherein the drive unit is held positively from the outside on the second housing part by a snap-lock connection.

2. Apparatus according to claim 1, wherein the housing opening in the first housing part serves at least for the camera unit used for image acquisition of the outer region of a vehicle, and the movable closure element is arranged on the first housing part, in particular, the movable closure element has a fixed axis of rotation.

3. Apparatus according to claim 1, wherein, the control unit and/or the drive unit are arranged from outside on the housing, in particular by snap-lock connection means.

4. Apparatus according to claim 1, wherein the drive unit is positioned in particular from the outside on the second housing part to drive the movable closure element via at least one connection element, whereby in particular an opening is provided in the second housing part for the connection element.

5. Apparatus according to claim 1, wherein the camera unit is movably arranged in the housing, whereby the camera unit is positioned behind the closure element in the housing in the closed position, while in the open position, it is uncovered by the closure element in order to acquire images, the camera unit is movable by the drive unit, and in particular, the camera unit is connected with a drive mechanism for the closure element.

6. Apparatus according to claim 1, wherein the camera unit and/or the closure element may be fixed in at least in the two end positions in an interlocking and/or form-fitting manner.

7. A method for operating an apparatus, in particular for a tailgate of a vehicle, with a camera unit, which serves to acquire images of the outside area of the vehicle, and with a control unit serving to control an electric lock for the tailgate, whereby a support element is provided which has a longitudinal axis of extension, whereby the camera unit and the control unit are arranged in particular next to one another on the vehicle along the longitudinal axis of extension of the support element on the vehicle, and at least the camera unit is protectively housed in a housing, and a movable closure element is provided to close a housing opening for the camera unit, which is movable by a rotary drive unit into at least two end positions, a closed position and an open position, wherein the housing is constructed of at least two parts, whereby the support element forms a first housing part, on which the control unit and the camera unit are arranged, wherein the support element forms at least a first Hat housing wall of the housing, on which a sealing dement is arranged, and which interacts with a housing edge of a second housing part, wherein the support element forms two housing walls of the housing, whereby the first housing wall is configured to be flat and is arranged essentially perpendicular to a second housing wall, whereby the second housing wall has the housing opening for the camera unit, and the drive unit is arranged on a second housing part, wherein a linear guide is provided between the second housing wall of the support element and the second housing part in order to assemble the two housing parts into a housing, whereby the second housing part can be pushed laterally onto the first housing part, wherein a labyrinth seal is provided between the second housing wall of the second housing part and the labyrinth seal is formed by the linear guide, and wherein the drive unit is held positively from the outside on the second housing part by a snap-lock connection, wherein in a first assembly step, a part of the apparatus is installed from the outside through an opening on the vehicle, on which part the control unit and the camera unit are arranged and in a further assembly step the remaining part of the apparatus is installed from the inside, on which part the drive unit is arranged, whereby the housing for the camera unit is formed by the assembly of the two parts.

8. A method according to claim 7, wherein, the housing is constructed of at least two parts, whereby the support element forms a first housing part on which the control unit and the camera unit are arranged, while in the first assembly step, the support part is installed from the outside through the opening on the vehicle, and the drive unit is arranged in a second housing part, whereby the housing halves are assembled in a further assembly step.

9. A method according to claim 7, wherein, the apparatus is fixed on the vehicle via at least one fixing element, in particular a fixing bracket, whereby in particular the fixing element holds the apparatus in at least a form-fitting manner while the fixing element for attaching the apparatus is only pushed on.

10. A method according to claim 9, wherein, the housing is constructed of at least two parts, whereby the support element forms a first housing part on which the control unit and the camera unit are arranged, while in the first assembly step, the support part is installed from the outside through the opening on the vehicle, and the drive unit is arranged in a second housing part, whereby the housing halves are assembled in a further assembly step.

\* \* \* \* \*